United States Patent [19]

Schwartz

[11] Patent Number: 5,025,369
[45] Date of Patent: Jun. 18, 1991

[54] COMPUTER SYSTEM

[75] Inventor: David J. Schwartz, Woodmere, N.Y.

[73] Assignee: David Schwartz Enterprises, Inc., New York, N.Y.

[21] Appl. No.: 236,493

[22] Filed: Aug. 25, 1988

[51] Int. Cl.⁵ .............................................. G06F 15/16
[52] U.S. Cl. ................................. 364/200; 364/229.41; 364/230.3
[58] Field of Search ... 364/200 MS File, 900 MS File

[56] References Cited

U.S. PATENT DOCUMENTS

| | | | |
|---|---|---|---|
| 3,219,980 | 11/1965 | Griffith | 364/200 |
| 3,962,685 | 6/1976 | Isle | 364/200 |
| 4,047,161 | 9/1977 | Davis | 364/200 |
| 4,130,865 | 12/1978 | Heart et al. | 364/200 |
| 4,149,240 | 4/1979 | Misumas et al. | 364/200 |
| 4,181,936 | 1/1980 | Kober | 364/200 |
| 4,223,380 | 9/1980 | Antonaccio | 364/200 |
| 4,251,861 | 2/1981 | Mago | 364/200 |
| 4,333,144 | 6/1982 | Whiteside | 364/200 |
| 4,394,727 | 7/1983 | Hoffman et al. | 364/200 |
| 4,394,730 | 7/1983 | Suzuki et al. | 364/200 |
| 4,539,655 | 9/1985 | Trussell et al. | 364/900 |
| 4,583,164 | 4/1986 | Tolle | 364/200 |
| 4,591,976 | 5/1986 | Webber et al. | 364/200 |
| 4,714,989 | 12/1987 | Billings | 364/200 |
| 4,800,521 | 1/1989 | Carter et al. | 364/900 |
| 4,805,107 | 2/1989 | Kieckhafer | 364/200 |
| 4,825,354 | 4/1989 | Agrawal | 364/200 |

OTHER PUBLICATIONS

Paged Memory Management Unit User's Manual by Motorola, published 1986–cover page, title page, copyright page pp. B-1 through B-10.

Primary Examiner—David Y. Eng
Attorney, Agent, or Firm—Blum Kaplan

[57] ABSTRACT

A multilevel distributed computer system for distributed processing preferably includes a plurality of personal computers. A task inputted to the system is divided into a plurality of portions. As many of the portions as possible are distributed for processing on the lowest level of the system. Those portions unprocessed on the lowest level are distributed for processing on the next lowest level. Remaining unprocessed portions of the task are distributed to available computers on successively higher levels of the system until all of the task have been distributed for processing.

70 Claims, 5 Drawing Sheets

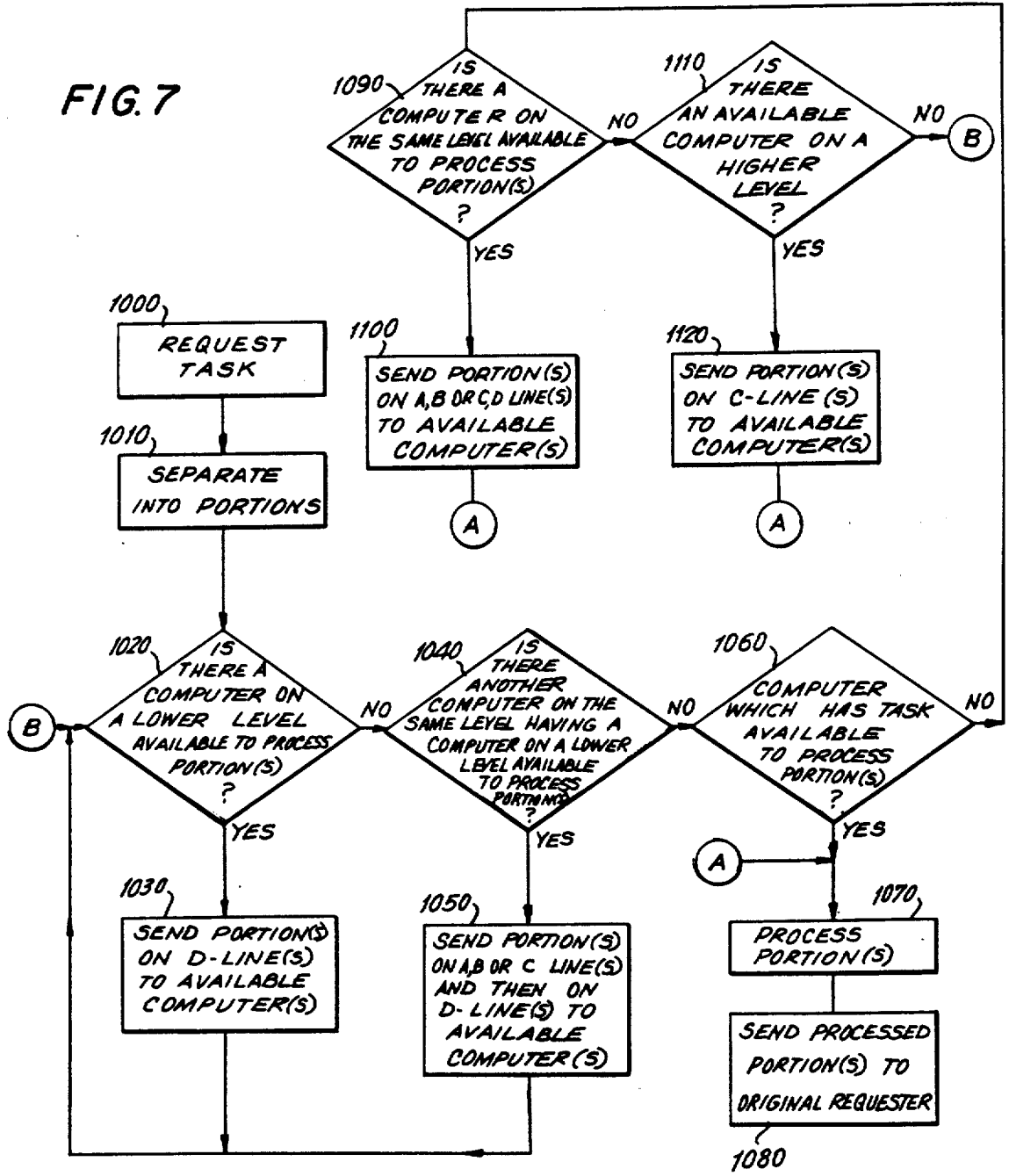

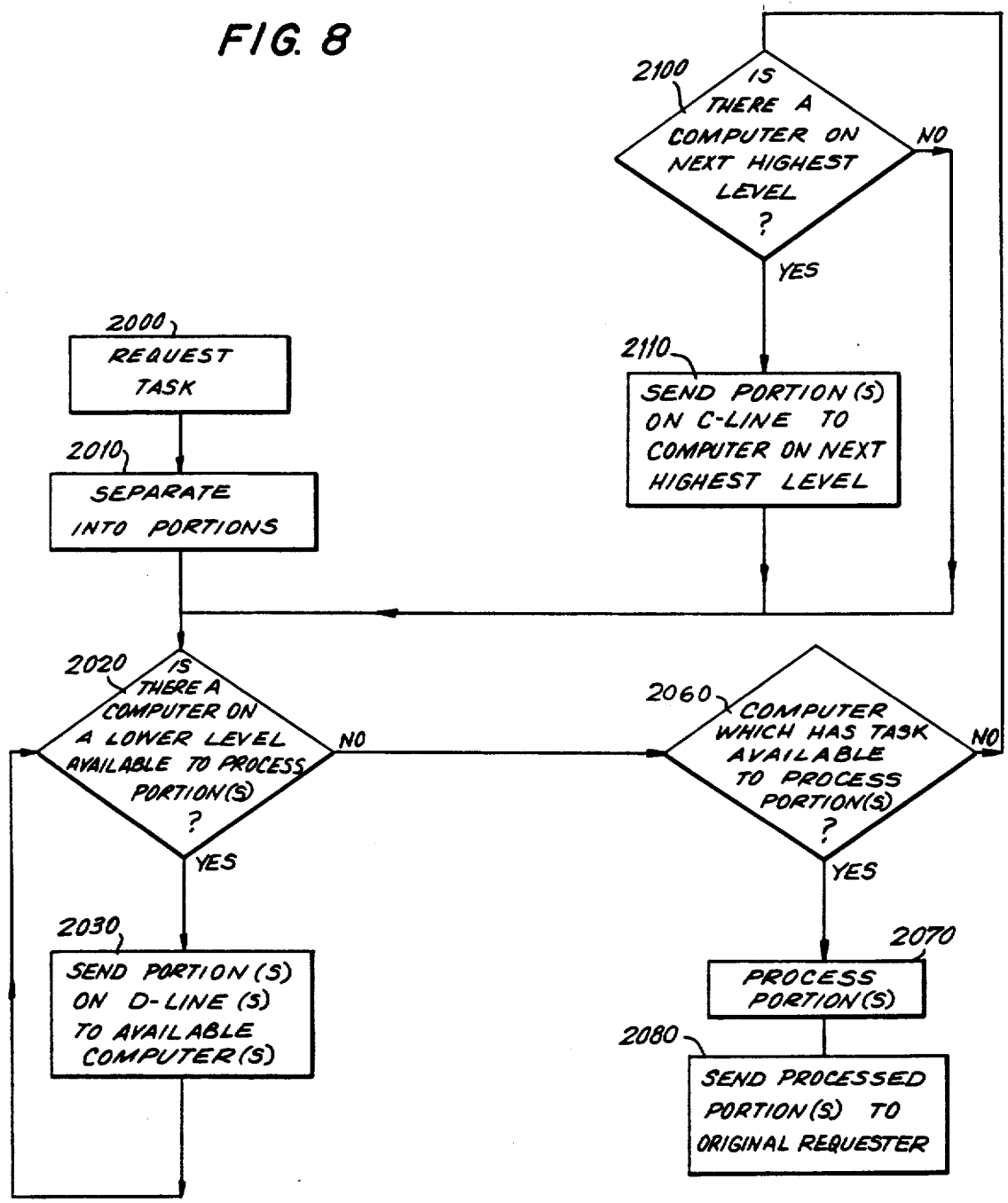

COMPUTER SYSTEM

BACKGROUND OF THE INVENTION

This invention relates generally to a computer system, and more particularly to distributed processing of a task by a distributed computer system.

A distributed computer system is a network of computers each of which function independently of but in a cooperative manner with each other. Versatility of a computer system can be increased by using a plurality of small computers, such as personal computers, to perform simple tasks and a central computer for longer more complex tasks. Such an arrangement lessens the load on the control computer and reduces both the volume and cost of data transmission.

A computer system in which portions of a task are performed by a number of different processors is commonly referred to as distributed processing. Normally, and unlike a typical distributed computer system, distributed processing is performed by a number of different microprocessors located within one central processor.

Generally, a distributed computer system can not perform distributed processing unless specific and detailed instructions are provided for one computer to serve as the equivalent of a slave processor to another computer. When such specific and detailed instructions are provided a distributed computer system performing distributed processing can not pass portions of a task from one computer to another computer. Rather, the complete task including the entire file is transferred between computers to sequentially process portions of the task.

By requiring that the complete task be transferred from one computer to another, a state of distributed processing is created. Generally, no more than about six computers can be used in the system resulting in a state of limited distributed processing. A distributed computer system performing distributed processing with more than about six computers is difficult to work with since many of the same lines, disk drives, printers and other equipment must be shared by each computer.

By requiring that the entire task be transferred as one package from one computer to the next, interaction between the distributed computer system and user while a task is being processed is difficult. No continuous active interconnection (i.e. communication) between computers is present in a distributed computer system except in regard to sharing the same hard disk drive and/or printer.

If a task is inputted to a computer which is presently unavailable to perform the task, the task is not automatically shifted to an available computer on the system since there is no continuous interaction between computers. Prior art distributed computer systems which automatically shift a task from an unavailable computer to an available computer require complex programming with specially designed communication links between the computers. Such communications links significantly add to the required interconnections between the computers and their associated cost.

Accordingly, it is desirable to provide a distributed computer system which performs distributed processing by passing portions rather than the entire task between computers. Preferably, the distributed computer system should include a plurality of personal computers operable for performing distributed processing to avoid the need for a mainframe.

SUMMARY OF THE INVENTION

Generally speaking, in accordance with the invention, a multilevel computer system includes at least one high level computer operable for receiving a task, for distributing portions of the task to be processed by one or more currently available low level computers and for processing, if it can, all undistributed portions of the task itself.

At least two low level computers are operable for receiving an additional task, for processing, if they can, portions of the additional task and distributing for processing those portions of the additional task unprocessed by the low level computers to the at least one high level computer if the latter is currently available for processing.

The multilevel computer system also includes communications link means for transferring portions of the task and additional task to the plurality of computers within the system (i.e. network). The communications link means has first links and second links. The first links couple at least one computer of the high level computer means to at least two computers of the low level computer means. Each second link couples at least two computers of the low level computer means together.

The number of first links coupled to at least one computer of the high level computer means and the number of second links coupled to one of the at least two computers of the low level computer means are unequal. To lessen the load of computers in the high level computer means, a pyramid-like network is constructed wherein the number of first links associated with any computer of the high level computer means is preferably greater than the number of second links associated with any computer of the low level computer means.

The first links transfer portions of the task and any additional task bidirectionally. The second links are designed to transfer portions of the task and any additional task either unidirectionally or bidirectionally. In processing each task within the computer system, different portions of the task are processed at the same time by different computers. Similarly, different portions of any additional task are processed at the same time by different computers.

Additional levels of computers can be added to the system to further distribute the processing of portions of a task and additional task. Lessening of the load that any one computer is requested to process results.

The multilevel computer system is particularly well suited for use in an office, corporation or the like wherein a hierarchy of personnel exists. Each user would be provided with a personal computer which would be coupled to one of the levels of the system.

Accordingly, it is an object of the invention to provide an improved distributed computer system in which portions of a task rather than the complete task are transferred between computers in processing of the task.

Another object of the invention is to provide an improved distributed computer system in which there is a continuous active interconnection between computers.

A further object of the invention is to provide a distributed computer system which includes a plurality of substantially identical computers such as, but not limited to, personal computers operable for performing distributed processing.

Still other objects and advantages of the invention will in part be obvious and will in part be apparent from the specification.

The invention accordingly comprises the several steps in a relation of one or more such steps with resepct to each of the others, and the apparatus embodying features of construction, a combination of elements and arrangements of parts which are adapted to effect such steps, all is exemplified in the following detail disclosure, and the scope of the invention will be indicated in the claims.

BRIEF DESCRIPTION OF THE DRAWINGS

For a fuller understanding of the invention, reference is had to the following description taken in conjunction with the accompanying drawings, in which:

FIG. 7 is a flow chart of FIG. 6 in accordance with a first embodiment of the invention; and FIG. 8 is a flow chart of FIG. 6 in accordance with an alternative embodiment of the invention.

DESCRIPTION OF THE PREFERRED EMBODIMENT

A distributed computer system, that is, a network of computers each of which functions independently but in a cooperative manner with each other computer, are well known in the art and generally are assembled in the form of a cluster, token ring or all together along the same line/bus (i.e. the ETHERNET ® computer system).

Figure 1:
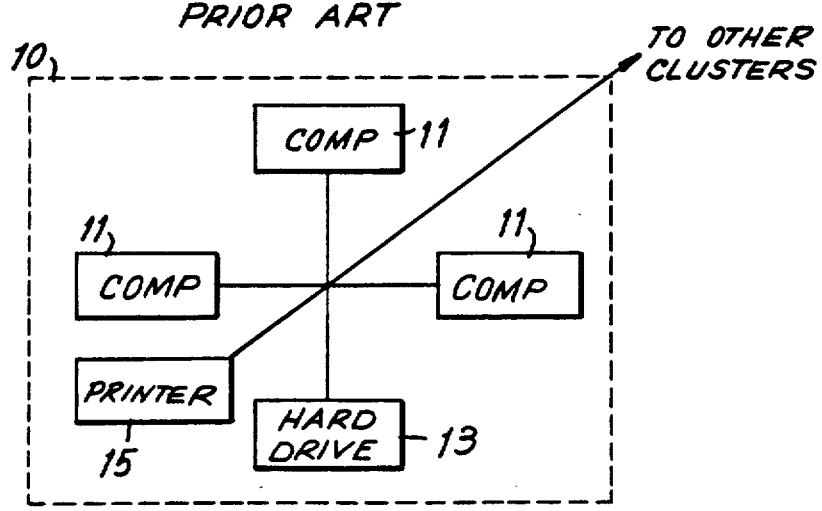
FIG. 1 is a block diagram of a cluster computer system.

As shown in FIG. 1, a prior art cluster computer system 10 includes between three to six computers 11 which are hard wired together and totally interlinked. Each computer 11 of system 10 uses one of a plurality of common lines 12, a common hard disk drive 13 and a common printer 15. Tasks can be distributed by passing the entire task from one computer 11 to another computer 11. In other words, the entire task is placed in a package and transferred along lines 12 from one computer 11 to another computer 11. Interaction between computers 11 is impractical.

In operation, once one portion of a task is solved by one computer 11 the entire task is then transferred to another computer 11 along lines 12 for the next portion of the task to be processed. Normally, there is no continuous active interconnection between computers 11. Computers which are marketed by Digital Equipment Corporation under the trademark VAX are commonly employed as computers 11 in system 10. No more than about six computers 11 can be used in any cluster system 10 since each computer 11 uses the same hard disk drive 13 and printer 15. Consequently, if more than about six computers are added to cluster system 10, each computer 11 is likely to trample on one or more of the other computers 11 in attempting to use hard disk drive 13 and/or printer 15.

Additionally, if one of the six computers 11 which receives the task is unavailable to process the task, there is no automatic shifting of the task to an available computer 11. More specifically, since there is no continuous interaction between computers 11, unless specific shifting instructions are included, no shifting of the task can take place. Furthermore, the entire task must be transferred from one computer 11 to another computer 11 rather than merely transferring portions of the task between computers 11. Such transfer of the entire task is commonly referred to as limited distributed processing and is not transparent to a user. In other words, a user is unaware of the state of the task within system 10 and therefore is unaware of whether the task inputted to one of the computers 11 is unavailable for processing of the task.

When VAX computers are used as computers 11, automatic shifting of the entire task between computers requires complex programming which is undesirable. Furthermore, such shifting of a complete task between lines 12 clutters up the interconnections between computers 11 further slowing down processing time.

Figure 2:
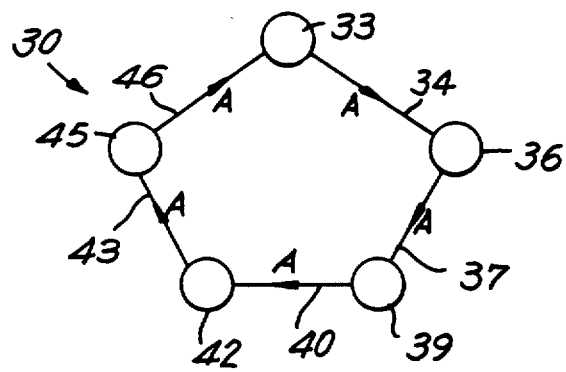
FIG. 2 is a block diagram of a token ring computer system.

As shown in FIG. 2, a prior art token ring computer system 30 includes a plurality of computers 33, 36, 39, 42 and 45. Computers 33 and 36 are connected together through a line 34. Computers 36 and 39 are connected together through a line 37. Computers 39 and 42 are connected together through a line 40. Computers 42 and 45 are connected together through a line 43 and computers 45 and 33 are connected together through a line 46. Information on lines 34, 37, 40, 43 and 46 travels in only one direction as denoted by an arrow A. In operation, the entire task after a portion thereof has been processed by, for example, computer 33 is transferred along line 34 to computer 36 which processes another portion of the task and then transfers the entire task to computer 39 along line 37. The processing of additional portions of the task and transferring of the entire task continue around token ring 30 until all portions of the task are complete.

The token ring scheme is based on collision avoidance. No two computers transmit on the same line at the same time. Information can not be transferred from one computer to another unless the computer which is transmitting the information has a "token ring". More particularly, the token ring is a piece of information which is part of the transmitted data stream and is required for transmitting information along one of the lines between computers. If information is to be sent between any two computers, the computer which is sending information must wait for the token ring to arrive. Consequently, only one of lines 34, 37, 40, 43 and 46 is used at any one time with all other lines remaining unused. Since information can be transferred between only two computers at any one time, processing of a task is extremely slow. Transfer of information among several computers can take several seconds, an acceptable period of time for transmission of messages but totally unacceptable for processing of a task.

Figure 3:
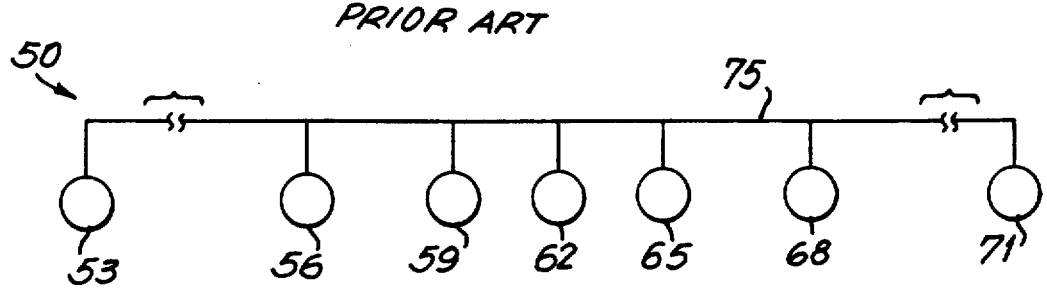
FIG. 3 is a block diagram of a computer system marketed by T.S.M. Company, Inc., St. Petersburg, Fla., under the registered trademark ETHERNET ®.

As shown in FIG. 3, the ETHERNET ® computer system 50 is based on collision detection (i.e. detecting when a collision occurs). System 50 includes a plurality of computers 53, 56, 59, 62, 65, 68 and 71 all of which are attached to a common line 75. Information is transmitted among computers 53, 56, 59, 62, 65, 68 and 71 along line 75 at the same time. If collisions of information occur, the information is merely retransmitted. Information is successfully transmitted between any two computers infrequently (e.g. about 10% of the time). System 50 is extremely inefficient. To ensure that a complete message has been received by for example computer system 59 from, for example, computer 53, computer 59 will retransmit the information received from computer 53 to computer 53 and await confirmation by computer 53 that the initial transmission received by computer 59 was complete. Consequently, processing of information is undesirably lengthened. Furthermore, if certain portions of the task are to be processed in a particular order system 50 requires an extremely long and undesirable period of time to accomplish the task.

Referring once again to FIG. 2, the number of computers shown (i.e. six computers) is to be understood as merely exemplary. Once system 30 is assembled and operating, no additional computers can be added to system 30 without destroying the system integrity. Additional computers, however, can be added to systems 10 and 50 of FIGS. 1 and 3 without destroying the system integrity, that is, while the systems are operating.

Systems 10, 30 and 50 provide limited distributed processing, that is, are limited in the number of portions of a task that can be satisfactorily distributed among the computers of each system at any one time. The more computers connected to any one of these three systems, the more time is required for processing of the task.

The invention avoids the foregoing drawbacks of distributed computer systems while providing unlimited distributed processing by providing a computer topography which allows computers of the system to communicate with each other on an efficient basis even when a large number of computers are used in the system.

Figure 4:
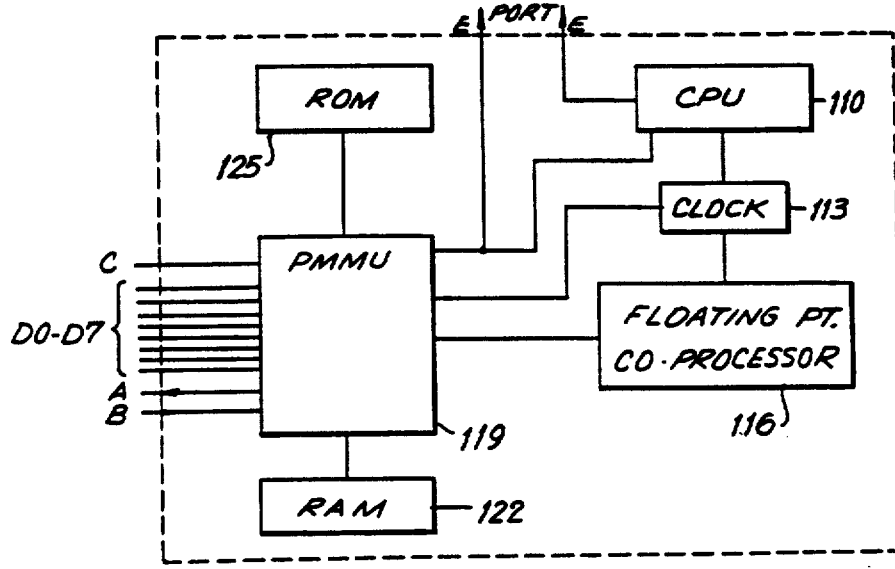
FIG. 4 is a block diagram of a computer in accordance with the invention.

As shown in FIG. 4, a computer 100 includes a central processing unit (CPU) 110, a clock 113, a floating point coprocessor 116, a page management memory unit (PMMU) 119, a read only memory (RAM) 122 and an electrically alterable read only memory (EAROM) 125. Floating point coprocessor 116 performs most of the mathematical calculations required. PMMU 119 takes care of security related functions, directs the placement of information into RAM 122, interfaces with hardware and organizes the processing of information within computer 100. CPU 110 performs similar functions to PMMU 119 and is augmented by PMMU 119. The program within the PMMU serves to extend the capabilities of CPU 110 so that the CPU 110 is able to perform security related functions, management functions and other desired functions. Computer 100 through PMMU 119 includes communications links A, B, C and $D_0$–$D_7$. These eleven different communications links are used to connect each computer 100 to the distributed computer system. Each of these links represents a path along which information travels from and to computer 100. Along each one of these links, may be one or more translators to ensure proper communication.

Each of the elements within computer 100 is an off the shelf item. For example, floating point coprocessor 116, CPU 110, and PMMU 119 are available from Motorola Corporation as part nos. MC 68881, MC 68020, and MC 68851, respectively. Peripheral equipment such as printers and terminals can be connected to one of the eleven links or to one of of a plurality of hardware expansion ports E.

The eleven communications links A, B, C, $D_0$–$D_7$ represents a compromise between using the fewest links possible to reduce the cost in connecting each computer 100 to the rest of the computers forming the distributed computer system and providing an adequate number of communications links so that a sufficiently complex distributed computer system can be established. If desired, more or less communications links can be used provided that an asymmetrical relation, as discussed below, is established between the A and B links of one computer and the associated C link of a computer on the next higher level of the system.

The A and B links are used as communications lines for computers 100 which are on the same level within the distributed computer system. Preferably, the A and B links connect all computers on the same level together to form a ring of computers (i.e. a complete chain) within that level. The C link of each computer 100 is used to communicate/transfer information to or receive information from another computer 100 which is on a higher level of the system. Computers on the higher level are used as a last resort for processing when one or more portions of the task cannot be distributed for processing to computers connected through the A, B and $D_0$–$D_7$ links.

The $D_0$–$D_7$ links of each computer 100 connect each computer 100 to one or more computers 100 on a lower level. Although peripheral equipment such as printers and terminals are normally connected to computer 100 through one or more hardware expansion ports E, such peripheral equipment, if desired, can be connected to one of the D links. Protocol, of course, would be affected by connecting such peripheral equipment to one of the D links rather than hardware expansion ports E. Hardware expansion ports E also can be used for connection of additional equipment such as RAMs or ROMs. Additional links equivalent to A, B, C and/or $D_0$–$D_7$ can be added through hardware expansion ports E.

The A and B links are used to shorten the path along which a portion of a task is to be distributed. Under one embodiment of the invention no portion of a task, if possible, should be distributed so that the path of distribution of one or more portions of the task from one computer 100 to another computer 100 includes yet another computer 100 which is on a higher level of the computer system. The A and B links (especially if used to form a comlete ring of computers on the same level) avoid such upward passing by providing communications links to computers 100 on the same level or lower levels. The C link is usually the only link along which the status (i.e. availability) is reported of lower level computers.

Figure 5:
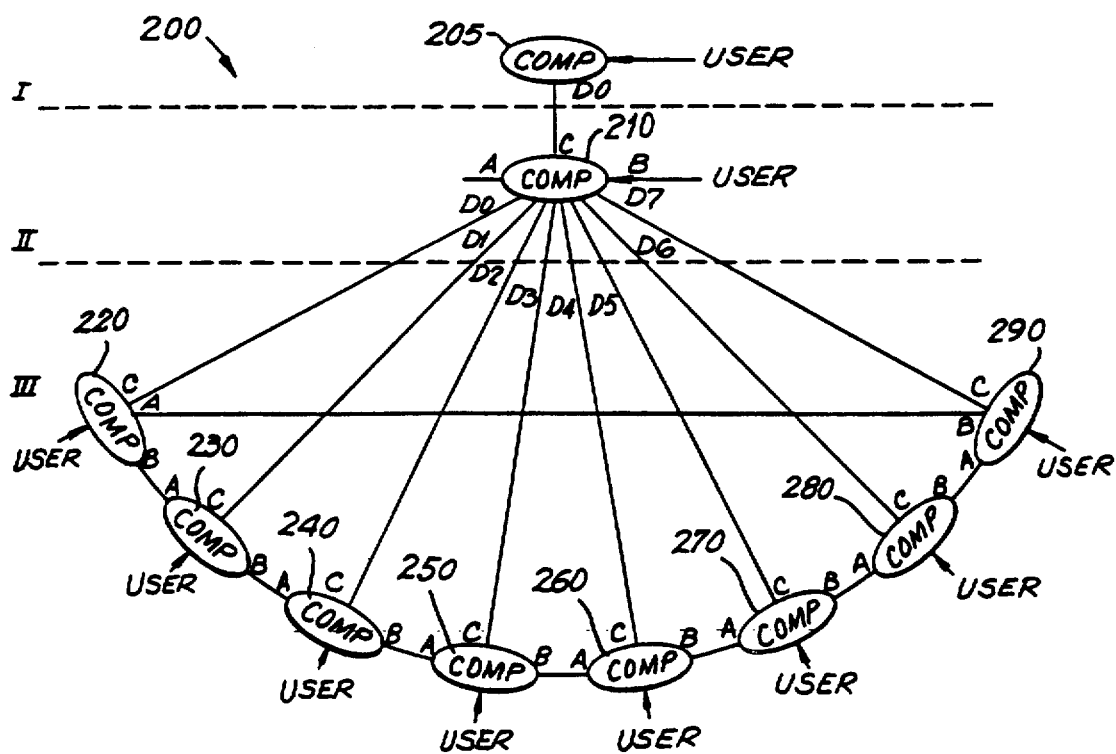
FIG. 5 is a block diagram of a distributed computer system in accordance with the invention.

Referring to FIG. 5, a first distributed computer system embodiment of the invention includes a computer system 200 having levels I, II and III. Level I is the highest level of system 200 and includes a single computer 205. A user can input a task to computer 205 through, for example, a B link. Computer 205 also includes a $D_0$ link which is connected to a C link of a computer 210. Computer 210 is in level II, the next lower level of system 200, and includes, for example, a B link through which an additional task can be requested of system 200 and links $D_0$–$D_7$. A plurality of computers 220, 230, 240, 250, 260, 270, 280 and 290 form the next lower level III of system 200. Computers throughout system 200 are constructed substantially similar to one another and are similar to computer 100 of FIG. 4.

The $D_0$–$D_7$ links of computer 210 are connected to the C links of computers 220–290, respectively. The A links of computers 220, 230, 240, 250, 260, 270, 280 and 290 are connected to the B links of computers 290, 280, 270, 260, 250, 240, 230 and 220, respectively. Further additional tasks can be requested through the $D_0$ link of each computer within level III.

System 200 provides a large amount of computer processing capability. Tasks such as, but not limited to, signal processing, image analysis and other real and nonreal time tasks are readily handled by system 200. If system 200 is to be used by a single user, the task to be processed would be inputted through the B link of computer 205 with peripheral equipment such as, but not limited to, the disk drives and printers attached to computer 205 through its hardware expansion port E so as to provide high speed access and convenience to the peripheral equipment.

Computer 210 essentially serves as a mediator ensuring that computers in level III pass portions of the task between each other and keeps system 200 organized. If possible, as explained below, computer 205 will not be asked to process any portion of the task. In other words, as long as computers 220–300 are available for processing all portions of the task, computer 205 will not process any portion of the task but will merely organize such processing so that computers 220–300 do not interfere with each other, for example, when using a disk drive and/or printer and be available for responding to any requests by a user.

Each computer of level III reports its status of availability through its C lines to computer 210 of level II which reports its status and the status of computers 220–290 through its C line to computer 205 of level I. Computer 205 is free to monitor the processing of a task by a user or to modify the processing of the task or other requests by the user.

When a request is inputted by a user to computer 205, computer 205 will immediately attempt to pass the task to computer 210 of level II assuming computer 210 is available based on its status report supplied to computer 205. By shifting the task to computer 210, a potential bottleneck between computers 205 and 210 through the single communications link therebetween is avoided. The potential bottleneck is due, in part, to providing peripheral equipment connected to computer 205.

With the task now having been transfered to computer 210, computer 210 which is provided with a continuous status report as to the availability of computers 220–300 divides the task into portions and distributes those portions to those computers of level III which are currently available. For example, if the task inputted to computer 205 involves image enhancement of a license plate whose numbers are difficult to read computer 205 will attempt to distribute as much of the entire task as possible to one or more available computers in levels II or III based on the status reports reported to computer 205. Assuming that the entire task is distributed to computer 210, computer 210 would then divide the task of image enhancement into different portions which would be distributed to those computers 220–290 which are available for processing on lower level III. Assuming each computer 220–290 is available for processing, each section of the image to be enhanced would be distributed for processing substantially concurrently to a different one of the computers of level III. The finished enhanced section of the image processed by each computer in level III then would be transferred to computer 210 for combining the enhanced sections together to form an enhanced image of the entire license plate.

Processing of a task on a real time basis can be performed by system 200 due to the computing power obtained from the plurality of computers available for processing at any instant in time. Additionally, computer 205 is available for receiving additional tasks and distributing such additional tasks throughout system 200.

Figure 6:
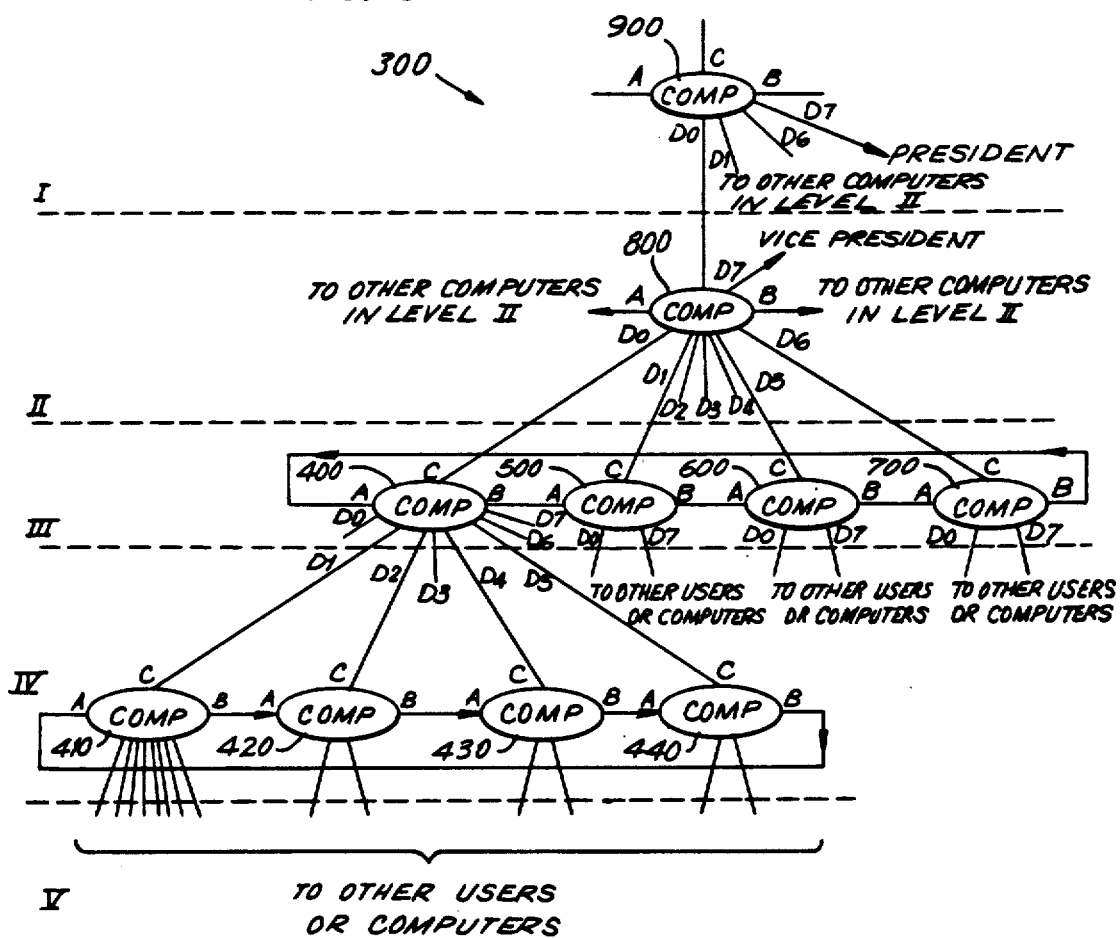
FIG. 6 is an expanded distributed computer system in accordance with the invention.

A more complex system 300 is shown in FIG. 6. System 300 is an alternative embodiment of the invention which illustrates the computing power which can be achieved through use of a number of substantially identical computers connected together. System 300 includes levels I, II, III, IV and V. Level I is the highest level of system 300 with levels II, III, IV and V representing descending levels of priority.

Level I includes a computer 900. A user, for example, the president of a company, inputs the requested task through the $D_0$ link. Computer 900 also includes a $D_1$ link which is connected to the C link of a computer 800. Links $D_2$–$D_6$ are connected to other computers (not shown) in level II. Level II of system 300 includes computer 800 and the other computers (not shown) which are connected to the A and B links of computer 800 or to other A and B links of other computers in level II to form a ring of computers within level II. Links $D_2$–$D_4$ are not used but available for connection to computers on level III. The $D_7$ link is used to receive requests from another user such as, for example, a vice president of the company. Links $D_0$, $D_1$, $D_5$ and $D_6$ are connected to the C links of a plurality of computers 400, 500, 600, and 700 which form level III, respectively.

The A links of computers 400, 500, 600 and 700 are connected to the B links of computers 700, 600, 500 and 400, respectively, to form a ring of computers in level III. Links $D_0$, $D_3$, $D_6$ and $D_7$ of computer 400 are not used but are available for connection to other computers in level IV or to other users Links $D_1$, $D_2$, $D_4$ and $D_5$ of computer 400 are connected to the C links of a plurality of computers 410, 420, 430 and 440 which form a portion of level IV. The D links of computers 500, 600 and 700 are connected to users or other computers similar to the D links of computer 400.

The A links of computers 410, 420, 430 and 440 are connected to the B links of computers 440, 430, 420 and 410, respectively, to form a subring of computers within level IV. Although not shown, other subrings of computers within level IV can be formed which are connected through their C links to computers 500, 600 and 700, respectively.

Level V includes computers which are connected to the D links of computers 410, 420, 430 and 440. Other levels below lowest level V can be formed if desired. Computers throughout system 300 are substantially similar in construction to each other and are constructed similar to computer 100.

FIG. 7 illustrates the operation of FIG. 6 in terms of a flow chart. Initially, a user requests that a task be processed in a step 1000. The task is, for example, inputted through an expansion hardware port E or one of the communications links. For exemplary purposes only, the task will be assumed inputted to the D link of computer 800. Computer 800 then separates the task into portions under step 1010. Any status reports which computer 800 may receive through one or more of its D links are checked under step 1020 to determine if a computer on level III or level IV is available for processing one or more portions of the task.

If a computer on a level III is available to process that portion of the task, such portion is sent on a D line to that available computer under step 1030. For example, if computer 400 is available for processing one or more portions of the task such one or more portions will be sent to computer 400 along the $D_0$ link of computer 800. Computer 400 will then check under step 1020 to see if there are any computers on a lower level available for processing the one or more portions of a task which it now has been asked to process. Since computer 400 is aware of the status of each computer on level IV through status signals being transmitted to computer 400 on its D links (i.e. the C links of computers on level IV), computer 400 is instantaneously aware of whether one or more portions of the task can be transferred to computers on level IV.

Assuming that computers 410–440 are not available for processing the portion of the task which computer 400 has received, computer 400 proceeds from step 1020 to step 1040. The ring of computers within level III allow computer 400 to transfer the one or more portions of the task through computers 500, 600 and/or 700 of level III to one or more of the computers within level IV which are connected to computers 500, 600 or 700 and which are available for processing. Computer 800 in level II does not need to be involved in the actual processing of any portion of the task at this time. Rather, computer 800 is still free to monitor and organize the processing of one or more portions of the task. In particular, computer 800 receives the status signals of all computers in levels III, IV and V and thereby monitors which computers in these levels are available for processing.

If one or more computers are available in level IV of system 300 which are coupled to computers 500, 600 or 700, such portions based on instructions from computer 800 would be sent from computer 400 to such available computers first along the A and/or B lines of level III and then through the one or more D links of computers 500, 600 or 700 under step 1050. Alternatively, the portions of the task to be processed are first transferred through the C link of computer 400 to computer 800, then transferred to computer 500, 600 and/or 700 through the D links of computer 800 and finally to the one or more available computers in level IV through one or more D links of computers 500, 600 and/or 700. The computers within level IV receiving these portions of the task would then proceed under step 1020 to determine if there are any computers on an even lower level available for processing such portions of the task. If there are no lower levels available for processing a task at the time of the status check, the computer within level IV having the portion of the task to process would proceed from step 1020 to step 1040.

If computer 400 can not locate any other computer on a lower level available for processing, under step 1060 computer 400 checks to see whether it is available to process that portion of the task. If computer 400 is available (which presumably it is since its status signal received by computer 800 indicated that computer 400 was available), such processing occurs under step 1070 with the processed task then transferred to computer 800 (i.e. the computer which originally requested that that portion of the task be processed) under step 1080.

If computer 800 can not transfer a portion of the task to an available computer on a lower level and is unable to presently process that portion of the task itself, computer 900 checks to see if any computers within level II are available for processing the task under step 1090. If a computer other than computer 800 within level II is available for processing the task, that portion of the task is transferred under step 1100 to the available computer either (i) along the A and/or B links of level II or (ii) first along the C link of computer 800 to computer 900 and then along a D link of computer 900 to level II. Upon receipt of that portion of the task by a computer on level II, processing proceeds under step 1070. The processed portion is then transferred to the original requesting computer (i.e. computer 800) under step 1080.

If computer 800 can not transfer that portion of the task to an available computer on a lower level (i.e. levels III or IV), can not process that portion of the task itself and has no computer on its same level (i.e. level II) which can process the task, the status of computer 900 on level I is checked by computer 900 to determine if it is available for processing under step 1110. If computer 900 is available, that portion of the task is sent to computer 900 along the C line of computer 800 under step 1120. Computer 900 then processes that portion of the task under step 1070. The processed portion is then sent to the original requesting computer under step 1080.

If there are no computers available throughout system 300 to process the one or more portions of the task, computer 800 will begin all over again by checking first to see if a computer on a lower level is available for processing.

In another alternative embodiment of the invention, those portions of the task which have not been transfered for processing to a lower level of the system through D links and which can not be currently processed by the computer which has these one or more portions is transfered along one or more C links until reaching a computer on a higher level which can either process the task itself or has received status signals of availability from a lower level computer. As can be readily appreciated, the higher the level of the system, the more computers report their availability status to a single computer and the more likely that an available computer will be found. If no computers are available within the system, however, the unprocessed portions of the task will have been transfered to a computer within the highest level of the system (e.g. computer 900) which will retain the unprocessed portions of the task until an available computer is found based on the status signals received by computer 900.

Under this alternative embodiment, the operation of computer system 300 follows the flow chart of FIG. 8. Initially, a user requests that a task be processed in step 2000. Once again, for exemplary purposes only, the task will be assumed inputted to the D link of computer 800. Computer 800 then separates the task into portions under step 2010. Any status reports which computer 800 may receive through one or more of its D links are checked under step 2020 to determine if a computer on level III or level IV is available for processing one or more portions of the task.

If a computer on level III is available to process a portion of the task, such portion is sent on a D line to that available computer under step 2030. For example, if computer 400 is available for processing one or more portions of the task such one or more portions will be sent to computer 400 along the $D_0$ link of computer 800. Computer 400 will then check under step 2020 to see if there are any computers on a lower level available for processing the one or more portions of a task which it now has been asked to process. Since computer 400 is aware of the status of each computer on level IV through status signals being transmitted to computer 400 on its D links (i.e. the C links of computers on level IV), computer 400 is instantaneously aware of whether one or more portions of the task can be transferred to computers on level IV.

Assuming that computers 410-440 are not available for processing a portion of the task which computer 400 has received, computer 400 proceeds from step 2020 to step 2060. Under step 2060, computer 400 which has the task checks to see that it is available to process that portion or portions. Assuming that it is, computer 400 processes these one or more portions under step 2070 and then sends the processed portion or portions to the original requesting computer, that is, computer 800 under step 2080.

Assuming that computer 800 can not find a computer on a lower level available for processing one or more portions of the task under step 2020, under step 2060 computer 800 checks to see if it is available to process the one or more portions of the task. If computer 800 is available, it processes the one or more portions under step 2070. Since it is the original requester of the task the processed portion remains with computer 800.

If computer 800 is unavailable to process the one or more portions of the task, under step 2100, computer 800 checks to see if there is a computer on a higher level (i.e. computer 900 on level I). The one or more portions of the task which have not yet been processed are then sent to computer 900 on the C link of computer 800 under step 2010. Under step 2020 computer 900 then checks to see if a computer on a lower level is available to process one or more portions of the task. If not, computer 900 checks to see if it is available for processing and if so processes the one or more portions under steps 2060, 2070 and 2080. If no computers in system 300 are available, computer 900 retains the one or more unprocessed portions under step 2060 and proceeds to step 2100 and then back to step 2020 until computer 900 or a computer on a lower level is available to process one or more portions of the task. Under such circumstances, the foregoing steps in the flow chart of FIG. 8 are repeated until all portions of the task have been processed by computer 900 or, preferably, computers on lower levels and then returned after processing to computer 800.

The operating system for each computer within systems 200 and 300 is responsible for handling page faults, memory allocations, message passing, CPU time allocation, local event flag waiting, security violations and interrupts and traps. Operating systems for handling such responsibilties are well known and can employ conventional techniques/schemes for handling the same.

System 300 can be adapted to provide a distributed computer system with personal computers (or any other type of suitable computers) throughout, for example, a corporation which not only allows the employees of the corporation to send messages to each other but of primary importance to allow each user of system 300 to distribute their tasks over the entire system 300. Consequently, each user need only bear the cost of one personal computer even though each user is obtaining the use of an equivalent mainframe, super computer or the like. In other words, each user is provided with an enormous amount of computer time with complete interlinking and sharing of hardware. The invention thus provides the advantages of a distributed computer system using unlimited distributed processing while not requiring a complex and costly computer program such as required under the prior art cluster system. Real time processing is provided by system 200 and 300 thereby avoiding the undesirable processing times required by prior art token ring systems. Furthermore, systems 200 and 300 avoid collisions of information during transfer between computers as in the ETHERNET ® system.

It will thus be seen that the objects set forth above, and those made apparent from the preceding description, are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. A multilevel computer system including high level computing means and low level computing means, comprising:

said high level computer means including at least one computer and operable for receiving a task, for distributing one or more portions of the task to said low level computer means for processing based on the availability, as determined by said high level computer means, of the low level computer means to process said one or more portions of the task, and for processing, if currently available, all undistributed portions of the task;

said low level computer means including at least two computers and operable for receiving an additional task, for processing, if currently available, portions of the additional task, for distributing for processing those portions of the unprocessed additional task to high level computer means based on the availability, as determined by said low level computer means, of the high level computer means to process one or more portions of the unprocessed additional task, and for processing portions of the task received from said high level computer means; and communications link means for transferring portions of the task within the computer system, said communications link means including first link means and second link means, said first link means coupling said at least one computer of said high level computer means to said at least two computers of said low level computer means, each of said second link means coupling said at least two computers of said low level computer means together;

wherein the availability of said low level computer means is communicated to said high level computer means and the availability of said high level computer means is communicated to said low level computer means along said first link means; and wherein the number of first and second link means associated with at least one of the at least two computers of said low level computer means are unequal.

2. The computer system of claim 1, wherein the number of first link means and the number of second link means associated with each computer of said low level computer means are unequal.

3. The computer system of claim 1, wherein said first link means are operable for transferring portions of the task and additional task bidirectionally.

4. The computer system of claim 3, wherein said second link means are operable for transferring portions of the task and additional task unidirectionally.

5. The computer system of claim 3, wherein said second link means are operable for transferring portions of the task and additional task bidirectionally.

6. The computer system of claim 1, wherein said high level computer means and said low level computer means are operable for processing different portions of the task at the same time.

7. The computer system of claim 6, wherein said high level computer means and said low level computer means are operable for processing different portions of the additional task at the same time.

8. The computer system of claim 1, further including a lower level computer means operable for receiving a further additional task, for processing, if currently available, portions of the further additional task and for distributing for processing those portions of the further additional task unprocessed by the lower level computer means to low level computer means based on the availability, as determined by said lower level computer means, of said low level computer means to process one or more portions of the unprocessed further additional task and for distributing for processing through said communications link means any remaining portions of the further additional task unprocessed by said low level computer means to said high level computer means based on the availability, as determined by said low level computer means, of said high level computer means to process one or more portions of the further additional task unprocessed by said low level computer means.

9. The computer system of claim 8, wherein said lower level computer means includes at least three computers and wherein said communications link means includes third link means and fourth link means, said third link means coupling said at least two computers of said low level computer means to said at least three computers of said lower level computer means, said fourth link means coupling said at least three computers of said lower level computer means together wherein the number of third link means and the number of fourth link means coupled to one of the computers on the lower level computer means are unequal.

10. The computer system of claim 9, wherein the number of third link means and the number of fourth link means associated with each computer of said lower level computer means are unequal.

11. The computer system of claim 8, wherein said high level means, low level means and lower level means are operable for processing different portions of the task at the same time.

12. The computer system of claim 8, wherein said high level computer means, low level computer means and lower level computer means are operable for processing different portions of the additional task at the same time.

13. The computer system of claim 8, wherein said high level computer means, low level computer means and lower level computer means are operable for processing different portions of the further additional task at the same time.

14. The computer system of claim 9, wherein the third link means are operable for transferring portions of the task, additional task and further additional task bidirectionally.

15. The computer system of claim 14, wherein the fourth link means are operable for transferring portions of the task, additional task and further additional task unidirectionally.

16. The computer system of claim 14, wherein the fourth link means are operable for transferring portions of the task, additional task and further additional task bidirectionally.

17. The computer system of claim 9, wherein each computer within the computer system is substantially similar in construction.

18. The computer system of claim 9, wherein each computer within the computer system is a personal type computer.

19. The computer system of claim 9, wherein each computer within the lower level computer means is coupled to at least one other computer within the lower level computer means through two fourth link means whereby the lower level computer means forms a ring of computers.

20. The computer system of claim 19, wherein each computer within the low level computer means is coupled to at least one other computer within the low level computer means through two second link means whereby the low level computer means forms a ring of computers.

21. The computer system of claim 20, wherein each computer means within the low level computer means is coupled to at least one other computer within the low level computer means through two second link means whereby the low level computer means forms a ring of computer means.

22. The computer system of claim 9, wherein the number of third link means is greater than the number of fourth link means.

23. The computer system of claim 1, wherein each computer within the computer system is substantially similar in construction.

24. The computer system of claim 23, wherein each computer within the computer system is a personal type computer.

25. The computer system of claim 1, wherein each computer within the low level computer means is coupled to at least one other computer within the low level computer means through two second link means whereby the low level computer means forms a ring of computers.

26. The computer system of claim 1, wherein the number of first link means is greater than the number of second link means.

27. A multilevel computer system including high level computer means and low level computer means, comprising:
said high level computer means including at least one computer and operable for receiving a task, for distributing one or more portions of the task to said low level computer means for processing based on the availability, as determined by said high level computer means, of the low level computer means to process one or more portions of the task and for processing, if currently available, all undistributed portions of the task;

said low level computer means including at least two computers and operable for receiving an additional task, for processing, if currently available, portions of the additional task, for distributing for processing those portions of the unprocessed additional task to high level computer means based on the availability, as determined by said low level computer means, of said high level computer means to process one or more portions of the unprocessed additional task and for processing portions of the task received from said high level computer means; and communications link means for transferring portions of the task within the computer system, said communications link means including first link means and second link means, said first link means coupling said at least one computer of said high level computer means to said at least two computers of said low level computer means and operable for transferring portions of the task and additional task bidirectionally, each of said second link means coupling said at least two computers of said low level computer means together;

wherein the availability of said low level computer means to process one or more portions of the task is communicated to said high level computer means and the availability of said high level computer means to process one or more portions of the unprocessed additional task is communicated to said low level computer means along said first link means; and wherein the number of first link means and the number of second link means associated with each computer of said low level computer means are unequal and wherein said high level computer means and said low level computer means are operable for processing different portions of the task at the same time and for processing different portions of the additional task at the same time and wherein each computer within the low level computer means is coupled to at least one other computer within the low level computer means through two second link means whereby the low level computer means forms a ring of computers.

28. A method of distributed processing within a network of computers, comprising:

arranging the network as a multilevel system including at least one high level computer and at least two low level computers;

establishing a communications link which includes first link means and second link means wherein the low level computers are coupled together through the second link means and at least one high level computer is coupled to the at least two low level computers through the first link means and wherein the number of first and second links associated with each low level computer are unequal;

distributing one or more portions of a task to be processed by low level computers along the communications links based on the availability of the low level computers to process said one or more portions of the task, said availability being previously communicated to the at least one high level computer along the first link means;

processing the distributed portions of the task by the currently available low lever computers; and processing all undistributed portions of the task by the at least one high level computer; and processing portions of an additional task by at least one of the at least two low level computers which are currently available for processing, and distributing for processing along the communications link those portions of the additional task unprocessed by the low level computers to any currently available high level computer.

29. The method of claim 28, further including processing different portions of the task at the same time.

30. The method of claim 28, further including processing different portions of the additional task at the same time.

31. The method of claim 28, further including transferring portions of the task along the first link means bidirectionally.

32. The method of claim 28, further including transferring portions of the task along the second link means bidirectionally.

33. The method of claim 28, further including transferring portions of the task along the second link means unidirectionally.

34. The method of claim 28, wherein arrangement of the network includes providing that each computer within the system is of substantially the same construction.

35. The method of claim 28, wherein establishment of the communications link includes coupling each low level computer to at least one other low level computer through two second link means whereby the low level computers form a ring of computers.

36. A method of distributed processing within a network of computers, comprising:

arranging the network as a multilevel system including at least one high level computer and at least two low level computers;

establishing a communications link which includes first link means and second link means wherein the low level computers are coupled together through the second link means to form a ring of computers and the at least one high level computer is coupled to the at least two low level computers through the first link means and wherein the number of first and second links associated with each low level computer are unequal;

distributing portions of a task to be processed by currently available low level computers along the communications link based on the availability of the low level computers to process one or more portions of the task, said availability being previously communicated to the at least one high level computer along the first link means;

processing the distributed portions of the task by currently available low level computers;

processing, if currently available, all undistributed portions of the task by the at least one high level computer;

processing portions of an additional task by currently available low level computers;

distributing for processing along the communications link those portions of the additional task unprocessed by the low level computers to the at least one high level computer based on the availability of the at least one high level computer to process one or more portions of the unprocessed additional task, said availability of the at least one high level computer being previously communicated to at least one of the low level computers along the first link mean; and processing the distributed portions of the additional task by one or more currently available high level computers;

wherein different portions of the task are processed at the same time and different portions of the additional task are processed at the same time and wherein portions of the task are transferred along the first link means bidirectionally.

37. A multilevel computer system including high level computing means and low level computing means, comprising:

communications link means for transferring portions of a task within the computer system, said communications link means including first link means and second link means;

said high level computer means including at least one computer means and operable for receiving the task, for distributing for processing portions of the task to said low level computer means based on the availability, as determined by said high level computer means, of said low level computer means to process one or more portions of the task, said availability being previously communicated to said high level computer means along said first link means of said communication link means and for processing, if currently available, all undistributed portions of the task;

said low level computer means including at least two computer means and operable for processing received portions of the task from the high level computer means, one of said at least two computer means operable for receiving an additional task and for processing, if currently available, portions of the additional task;

said high level computer means also operable for receiving from one of said at least two computer means of said low level computer means portions of the unprocessed additional task and for distributing, for processing those portions of the unprocessed additional task to the other of said at least two computer means for processing by the latter based on the availability of the other of said at least two computer means to process one or more portions of the unprocessed additional task, said availability of the other of said at least two computer means being previously communicated to said high level computer means from the other of said at least two computer means along said first link means and, if available, processing of those portions of the unprocessed additional task undistributed to said other of said at least two computer means;

said communications link means also for communicating to said high level computer means along said first link means from said low level computer means the current availability of said low level computer means to process one or more portions of the task and for communicating to said high level computer along said first link means from the other of said at least two computer means the current availability of the other of said at least two computer means to process one or more portions of the unprocessed additional task, said first link means coupling said at least one computer means of said high level computer means to said at least two computer means of said low level computer means, each of said second link means coupling said at least two computer means of said low level computer means together;

wherein the number of first link means and the number of second link means coupled to one of the at least two computer means of said low level computer means are unequal.

38. The computer system of claim 37, wherein the number of first link means and the number of second link means associated with each computer means of said low level computer means are unequal.

39. The computer system of claim 37, wherein said first link means are operable for transferring portions of the task and additional task bidirectionally.

40. The computer system of claim 39, wherein said second link means are operable for transferring portions of the task and additional task unidirectionally.

41. The computer system of claim 39, wherein said second link means are operable for transferring portions of the task and additional task bidirectionally.

42. The computer system of claim 37, wherein said high level computer means and said low level computer means are operable for processing different portions of the task at the same time.

43. The computer system of claim 42, wherein said high level computer means and said low level computer means are operable for processing different portions of the additional task at the same time.

44. The computer system of claim 43, further including lower level computer means which includes at least three computer means and operable for processing received portions of the task and additional task, one of said at least three computer means operable for receiving a further additional task and processing, if currently available, portions of the further additional task, and wherein one of said at least two computer means of said low level computer means is also operable for receiving from said one of said at least three computer means of said lower level computer means portions the unprocessed further additional task and for distributing for processing, if available, those portions of the unprocessed further additional task to the other two of said at least three computer means of said lower level computer means and, if available, processing those portions of the unprocessed further additional task undistributed to said other two of said at least three computer means.

45. The computer system of claim 44, wherein said high level computer means is further operable for receiving from said one of at least two computer means of said low level computer means portions of the undistributed unprocessed further additional task and for distributing for processing, if available, those portions of the undistributed unprocessed further additional task to the other of said at least two computer means and, if available, processing those portions of the undistributed unprocessed further additional task which are not distributed to said other of said at least two computer means.

46. The computer system of claim 44, wherein said communications link means includes third link means and fourth link means, said third link means coupling said at least two computer means of said low level computer means to said at least three computer means of said lower level computer means, said fourth link means coupling said at least three computer means of said lower level computer means together wherein the number of third link means and the number of fourth link means coupled to one of the computer means on the lower level computer means are unequal.

47. The computer system of claim 46, wherein the number of third link means and the number of fourth link means associated with each computer means of said lower level computer means are unequal.

48. The computer system of claim 46, wherein the third link means are operable for transferring portions of the task, additional task and further additional task bidirectionally.

49. The computer system of claim 48, wherein the fourth link means are operable for transferring portions of the task, additional task and further additional task unidirectionally.

50. The computer system of claim 48, wherein the fourth link means are operable for transferring portions of the task, additional task and further additional task bidirectionally.

51. The computer system of claim 46, wherein each computer means within the computer system is substantially similar in construction.

52. The computer system of claim 46, wherein each computer means within the computer system is a personal type computer.

53. The computer system of claim 46, wherein each computer means within the lower level computer means is coupled to at least one other computer means within the lower level computer means through two fourth link means whereby the lower level computer means forms a ring of computer means.

54. The computer system of claim 44, wherein said high level computer means, low level computer means and lower level computer means are operable for processing different portions of the task at the same time.

55. The computer system of claim 44, wherein said high level computer means, low level computer means and lower level computer means are operable for processing different portions of the additional task at the same time.

56. The computer system of claim 44, wherein said high level computer means, low level computer means and lower level computer means are operable for processing different portions of the further additional task at the same time.

57. The computer system of claim 46, wherein the number of third link means is greater than the number of fourth link means.

58. The computer system of claim 37, wherein each computer means within the computer system is substantially similar in construction.

59. The computer system of claim 58, wherein each computer means within the computer system is a personal type computer.

60. The computer system of claim 37, wherein each computer means within the low level computer means is coupled to at least one other computer means within the low level computer means through two second link means whereby the low level computer means forms a ring of computer means.

61. The computer system of claim 37, wherein the number of first link means is greater than the number of second link means.

62. A multilevel computer system including high level computer means and low level computer means, comprising:

communications link means for transferring the portions of a task within the computer system, said communications link means including first link means and second link means;

said high level computer means including at least one computer means and operable for receiving a task, for distributing portions of the task to said low level computer means for processing of said portions based on the availability of the low level computer means to process one or more portions of the task, said availability being previously communicated to said high level computer means from said low level computer means along first link means of communication link means and for processing, if currently available, all undistributed portions of the task;

said low level computer means including at least two computer means and operable for processing received portions of the task from the high level computer means, one of said at least two computer means operable for receiving an additional task and for processing, if currently available, portions of the additional task;

said high level computer means also operable for receiving from said one of said at least two computer means of said low level computer means portions of the unprocessed additional task and for distributing for processing those portions of the unprocessed additional task to the other of said at least two computer means based on the availability of the other said at least two computer means to process one or more portions of the unprocessed additional task, said availability of the other of said at least two computer means being previously communicated to said high level computer means from the other of said at least two computer means along said first link means, and, if available, processing those portions of the unprocessed additional task undistributed to said other of said at least two computer means;

said communications link means also for communicating to said high level computer means along said first link means from said low level computer means the current availability of said low level computer means to process one or more portions of the task and for communicating to said high level computer means along said first link means from the other of said at least two computer means the current availability of the other of said at least two computer means to process one or more portions of the unprocessed additional task, said first link means coupling said at least one computer means of said high level computer means to said at least two computer means of said low level computer means and operable for transferring the portions of the task and additional task bidirectionally, each of said second link means coupling said at least two computer means of said low level computer means together;

wherein the number of first link means and the number of second link means associated with each computer means of said low level computer means are unequal and wherein said high level computer means and said low level computer means are operable for processing different portions of the task at the same time and for processing different portions of the additional task at the same time and wherein each computer means within the low level computer means is coupled to at least one other computer means within the low level computer means through two second link means whereby the low level computer means forms a ring of computers.

63. A method of distributed processing within a network of computers, comprising:

arranging the network as a multilevel system including at least one high level computer and at least two low level computers;

establishing a communications link which includes first link means and second link means wherein the low level computers are coupled together through the second link means and at least one high level computer is coupled to the at least two low level computers through the first link means and wherein the number of first and second link means associated with each low level computer are unequal;

distributing along the first link means portions of the task to be processed by currently available low level computers based on the availability of the low level computers to process one or more portions of the task, said availability being previously communicated to said at least one high level computer from at least one of the at least two low level computers along said first link means;

processing the distributed portions of the task by the currently available low level computers;

processing, if currently available, all undistributed portions of the task by the at least one high level computer;

processing, if currently available, portions of an additional task by one of the at least two low level computers;

distributing along the first link means those portions of the additional task unprocessed by said one of the at least two low level computers to the at least one high level computer if the other of said at least two low level computers is currently available for processing of the additional task;

distributing along the first link means, if available, those portions of the additional task to the other of said at least two low level computers based on the availability of the other of said at least two low level computers to process one or more portions of the unprocessed additional task, said availability of the other of said at least two low level computers being previously communicated to said at least one high level computer from the other of said at least two low level computers along said first link means;

processing by the second of said at least two low level computers the received portions of the additional task; and processing, if available, by the at least one high level computer the unprocessed portions undistributed to the second of the at least two low level computers.

64. The method of claim 63, further including processing different portions of the task at the same time.

65. The method of claim 63, further including processing different portions of the additional task at the same time.

66. The method of claim 63, further including transferring portions of the task along the first link means bidirectionally.

67. The method of claim 66, further including transferring portions of the task along the second link means bidirectionally.

68. The method of claim 66, further including transferring portions of the task along the second link means unidirectionally.

69. The method of claim 63, wherein arrangement of the network includes providing that each computer within the system is of similar construction.

70. The method of claim 63, wherein establishment of the communications link includes coupling each low level computer to at least one other low level computer through two second link means whereby the low level computers form a ring of computers.

* * * * *